UNITED STATES PATENT OFFICE.

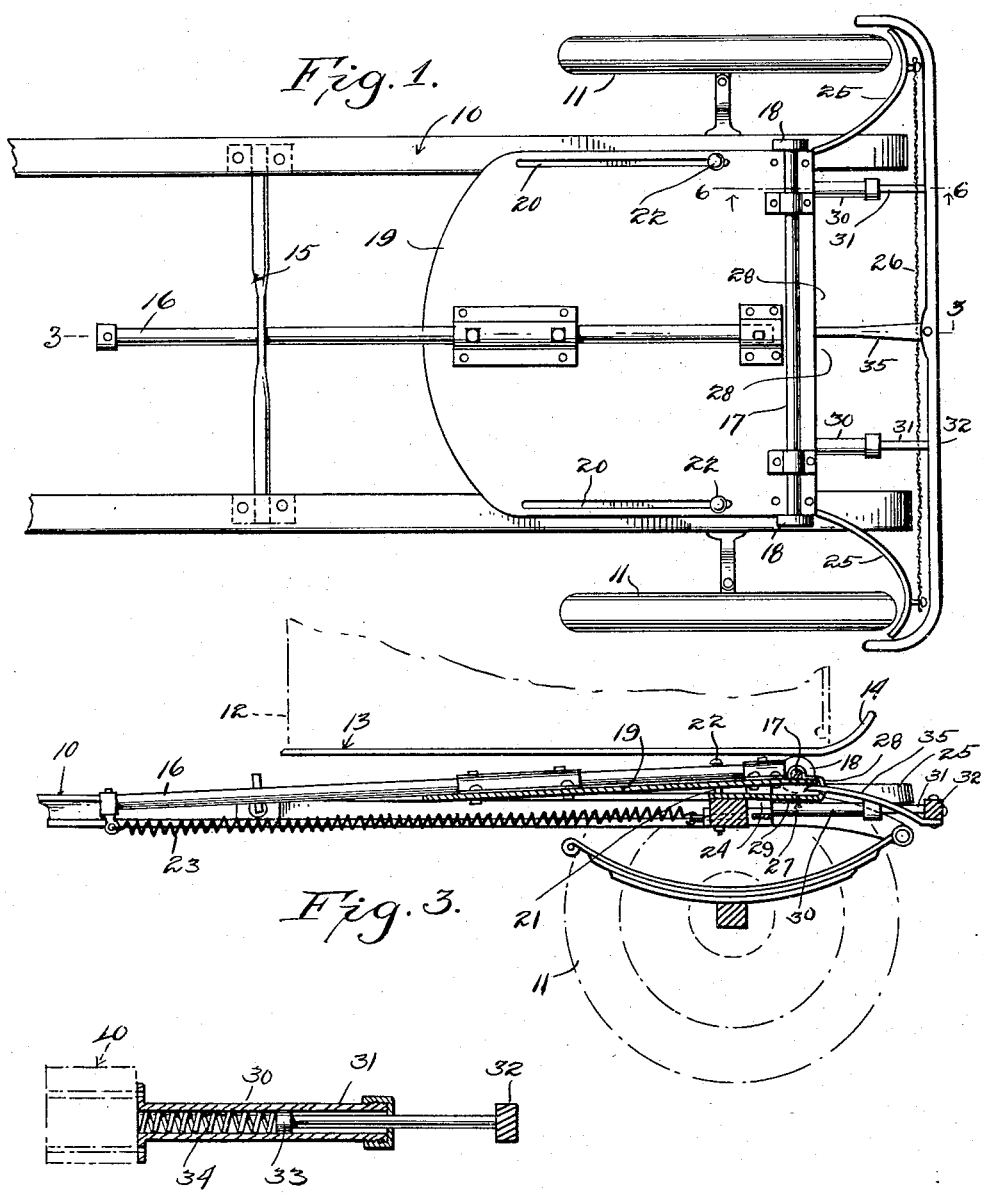

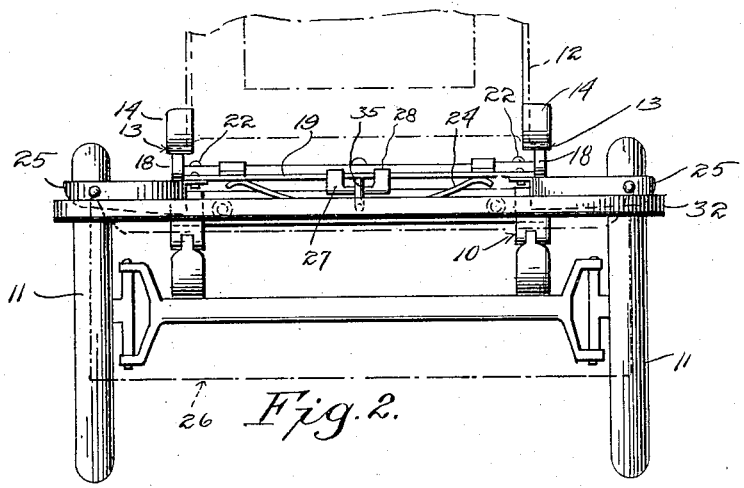
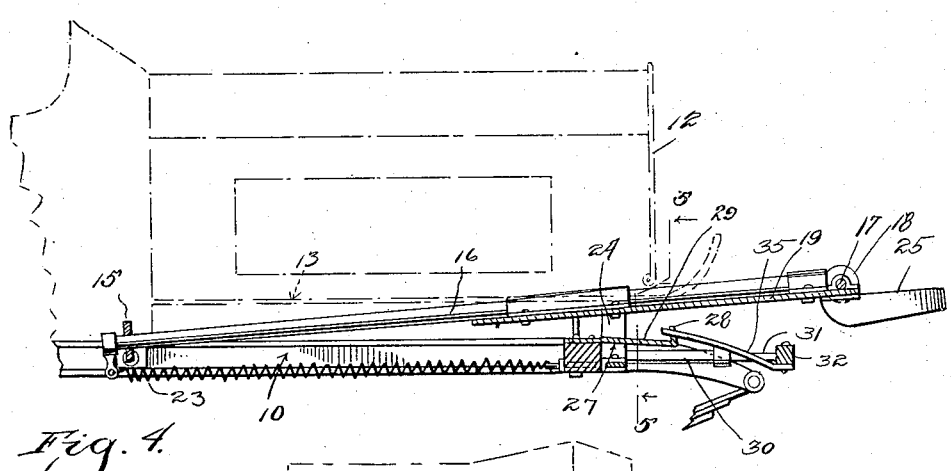
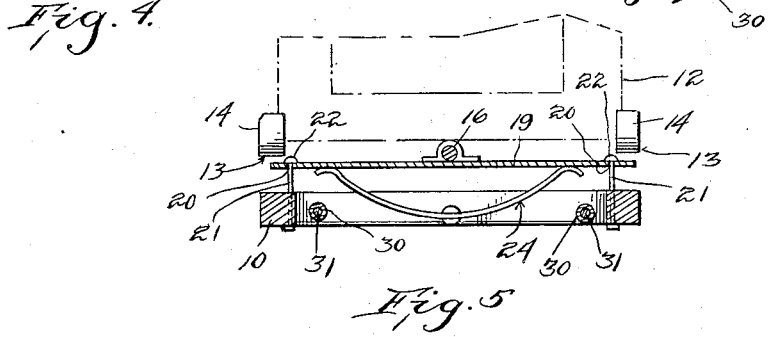

JOHN KONIUSZEWSKI, OF MANCHESTER, NEW HAMPSHIRE.

AUTOMATIC FENDER FOR AUTOMOBILES.

1,219,113.  Specification of Letters Patent.  Patented Mar. 13, 1917.

Application filed January 10, 1917. Serial No. 141,512.

*To all whom it may concern:*

Be it known that I, JOHN KONIUSZEWSKI, a subject of the Emperor of Austria-Hungary, residing at Manchester, in the county of Hillsborough and State of New Hampshire, have invented certain new and useful Improvements in Automatic Fenders for Automobiles, of which the following is a specification.

This invention relates to automobiles and has special reference to an automatic fender for automobiles and other like vehicles.

One important object of the invention is to provide an improved general construction for devices of this character.

A second important object of the invention is to provide an improved arrangement of fender so constructed that, upon release for actuation, it will first move forwardly and then upwardly so as to toss a person upwardly out of the way of the machine rather than to push him down underneath the machine as in the type of fender which does not move upwardly.

A third important object of the invention is to provide an improved latch and releasing device for use in connection with fenders of this character.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Figure 1 is a plan view of an automobile chassis showing the device applied thereto and in retracted position.

Fig. 2 is a front view thereof.

Fig. 3 is a section on the line 3—3 of Fig. 1.

Fig. 4 is a section similar to Fig. 3 but showing the fender in protracted position.

Fig. 5 is a section on the line 5—5 of Fig. 4.

Fig. 6 is a detail section on the line 6—6 of Fig. 1.

In the embodiment of the invention herein illustrated the device has been shown as attached to an automobile having a frame 10 supported on wheels 11. At the front of this frame is supported a hood which is indicated in dotted lines at 12 in Fig. 2 and beneath this hood and spaced above the frame 10 are longitudinally extending guide rails 13 which have upwardly curved front ends 14 projecting forwardly of the hood.

Extending between and journaled in the side members of the frame 10 is a rocking guide 15 having an opening in the center thereof wherethrough passes a bar 16 carrying at its front end a cross bar 17. This cross bar 17 has journaled on its ends the rollers 18 which bear on the under surfaces of the track or rails 13. Fixed to the front end of the bar 16 and to the cross bar 17 is a plate 19 having longitudinally extending slots 20 formed therein adjacent the sides thereof. Through these slots extend vertical stop and guide pins 21 provided on their upper ends with heads 22 which serve to limit the movement of the plate upward the pins themselves serving by their engagement with the ends of the slots, to limit the longitudinal movement of the plate 19.

Secured to the front cross member of the frame 10 is the front end of a coiled tension spring 23, the rear end of the spring being secured to the rear end of the bar 16. This spring is at all times under strong tension so that it constantly urges the bar and parts connected therewith forward. Secured to the front of the front member of the frame 10 is a leaf spring 24 which urges the plate upward and holds the rollers 18 against the rails 13 during the forward movement of the plate.

Extending forwardly and outwardly from the front corners of the plate 19 are the curved resilient horns 25 which in the retracted position of the plate act as wheel guards and in the protracted position of said plates serve to assist in lessening the shock in case the automobile strikes a solid obstruction. Moreover, these horns are preferably used to carry a net 26 so that, in striking a person injury will not be inflicted on such person by coming in contact with the cross bar 17.

In order to hold the device normally retracted there is fixed to the front frame member a latch 27 having its forward end bifurcated and turned up as at 28. This bifurcated end engages against the cross bar 17 when the device is in normal position, being held raised by the spring shank 29.

In order to provide for the automatic release of the device, when a person or other obstacle is struck, a pair of tubular guides 30 project forwardly from the frame 10 and in these guides move plungers 31 having their forward ends connected by a tie rod 32 which extends across the entire front of the automobile. These plungers are provided at their inner ends with heads 33 which engage the forward ends of the guides 30 to limit outward movement of said plungers and between these heads and the rear ends of the guides are coil springs 34 which constantly urge the plungers outwardly. Carried by the center of the tie rod is a finger 35 which passes between the sides of the bifurcation and bears against the under side of the plate 19. It will be observed that the net 26 is only held at the top so that when the parts are in the position shown in Figs. 1 and 3 the net may hang over the bar 32, the purpose of the net being merely to afford a flexible means which will prevent the forward edge of the plate 19 from striking a person. It will be obvious, that under these conditions, the net may be so narrow as practically to amount to a band.

Now, when the automobile strikes a person the tie rod strikes his body first and is pushed back and releases the latch. This permits the plate to be projected forwardly and as it moves forward it rises so that the person is engaged by the net and pushed away from the front of the vehicle. In striking a solid obstruction the horns will engage the obstruction and absorb the shock.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

1. The combination with an automobile frame; of a fender movable longitudinally of said frame, spring means constantly urging said fender to protracted position, a releasable latch normally holding the fender retracted, means to lift the front end of the fender as it moves forwardly, and means to release the latch.

2. The combination with an automobile frame; of a fender movable longitudinally of said frame, spring means constantly urging said fender to protracted position, a releasable latch normally holding the fender retracted, a spring beneath the forward part of the fender and constantly urging it upward, and means to release said latch.

3. The combination with an automobile frame; of a fender movable longitudinally of said frame, spring means constantly urging said fender to protracted position, a releasable latch normally holding the fender retracted, guide rails supported on said frame above the fender and having their forward ends curved upwardly, rollers carried by the fender and engaging the under surface of the guide rails, a spring carried by the frame and bearing against the fender to hold the rollers against the guide rails, and means to release said latch.

4. The combination with an automobile frame; of a fender movable longitudinally of said frame, spring means constantly urging said fender to protracted position, a releasable latch normally holding the fender retracted, means to lift the front end of the fender as it moves forwardly, means to release the latch, and stops to limit the longitudinal and vertical movements of the fender.

5. The combination with an automobile frame; of a fender movable longitudinally of said frame, spring means constantly urging said fender to protracted position, a releasable latch normally holding the fender retracted, a spring beneath the forward part of the fender and constantly urging it upward, means to release said latch, and stops to limit the longitudinal and vertical movements of the fender.

6. The combination with an automobile frame; of a fender movable longitudinally of said frame, spring means constantly urging said fender to protracted position, a releasable latch normally holding the fender retracted, guide rails supported on said frame above the fender and having their forward ends curved upwardly, rollers carried by the fender and engaging the under surface of the guide rails, a spring carried by the frame and bearing against the fender to hold the rollers against the guide rails, means to release said latch, and stops to limit the longitudinal and vertical movements of the fender.

7. The combination with an automobile frame; of a fender movable longitudinally of said frame, spring means constantly urging said fender to protracted position, a releasable latch normally holding the fender retracted, means to lift the front end of the fender as it moves forwardly, means to release the latch, stops to limit the longitudinal and vertical movements of the fender, and forwardly and outwardly curved resilient horns on the forward corners of said fender.

8. The combination with an automobile frame; of a fender movable longitudinally of said frame, spring means constantly urging said fender to protracted position, a releasable latch normally holding the fender retracted, a spring beneath the forward part of the fender and constantly urging it upward, means to release said latch, stops to limit the longitudinal and vertical movements of the fender, and forwardly and outwardly curved resilient horns on the forward corners of said fender.

9. The combination with an automobile frame; of a fender movable longitudinally of said frame, spring means constantly urging said fender to protracted position, a releasable latch normally holding the fender retracted, guide rails supported on said frame above the fender and having their forward ends curved upwardly, rollers carried by the fender and engaging the under surface of the guide rails, a spring carried by the frame and bearing against the fender to hold the rollers against the guide rails, means to release said latch, stops to limit the longitudinal and vertical movements of the fender and forwardly and outwardly curved resilient horns on the forward corners of said fender.

10. The combination with an automobile frame; of a fender movable longitudinally of said frame, spring means constantly urging said fender to protracted position, a releasable latch normally holding the fender retracted, means to lift the front end of the fender as it moves forwardly, means to release the latch, stops to limit the longitudinal and vertical movements of the fender, and forwardly and outwardly curved resilient horns on the forward corners of said fenders, a nut supported by and extending between said horns.

11. The combination with an automobile frame; of a fender movable longitudinally of said frame, spring means constantly urging said fender to protracted position, a releasable latch normally holding the fender retracted, a spring beneath the forward part of the fender and constantly urging it upward, means to release said latch, stops to limit the longitudinal and vertical movements of the fender, and forwardly and outwardly curved resilient horns on the forward corners of said fender, and a net supported by and extending between said horns.

12. The combination with an automobile frame; of a fender movable longitudinally of said frame, spring means constantly urging said fender to protracted position, a releasable latch normally holding the fender retracted, guide rails supported on said frame above the fender and having their forward ends curved upwardly, rollers carried by the fender and engaging the under surface of the guide rails, a spring carried by the frame and bearing against the fender to hold the rollers against the guide rails, means to release said latch, stops to limit the longitudinal and vertical movements of the fender and forwardly and outwardly curved resilient horns on the forward corners of said fender, and a net supported by and extending between said horns.

In testimony whereof I affix my signature in the presence of two witnesses.

JOHN KONIUSZEWSKI.

Witnesses:
FERDINAND FARLEY,
NICHOLAS PLESHY.